(12) United States Patent
Wang et al.

(10) Patent No.: US 7,636,384 B2
(45) Date of Patent: Dec. 22, 2009

(54) METHOD FOR DETECTING THE ORTHOGONAL CODE CDMA SIGNAL

(75) Inventors: Yingmin Wang, Beijing (CN); Guiliang Yang, Beijing (CN); Changguo Sun, Beijing (CN)

(73) Assignee: Da Tang Mobile Communications Equipment Co., Ltd., Beijing (CN)

( * ) Notice: Subject to any disclaimer, the term of this patent is extended or adjusted under 35 U.S.C. 154(b) by 578 days.

(21) Appl. No.: 10/562,523

(22) PCT Filed: Jul. 29, 2004

(86) PCT No.: PCT/CN2004/000881

§ 371 (c)(1),
(2), (4) Date: Jun. 9, 2006

(87) PCT Pub. No.: WO2005/013527

PCT Pub. Date: Feb. 10, 2005

(65) Prior Publication Data

US 2007/0058701 A1    Mar. 15, 2007

(30) Foreign Application Priority Data

Aug. 5, 2003    (CN) ................................. 03 1 49765

(51) Int. Cl.
*H04B 1/69*     (2006.01)
*H04B 1/707*    (2006.01)
*H04B 1/713*    (2006.01)

(52) U.S. Cl. ....................... 375/152; 375/150; 375/148; 375/147; 375/143; 375/142; 370/342; 370/320; 370/335; 370/441

(58) Field of Classification Search ................. 375/152, 375/150, 148, 147, 144, 143, 142; 370/342, 370/320, 335, 441
See application file for complete search history.

(56) References Cited

U.S. PATENT DOCUMENTS 6,865,218 B1 *  3/2005  Sourour ..................... 375/148

FOREIGN PATENT DOCUMENTS

| CN | 1355627 A | 6/2002 |
|---|---|---|
| EP | 1 296 462 A1 | 3/2003 |
| JP | 11-251965 | 9/1999 |

OTHER PUBLICATIONS

Noneaker "Optimal Combining for Rake Reception in Mobile Cellular CDMA Forward Links" Military Communications Conference (1998) IEEE p. 842-846.
Varanasi "Parallel Group Detection for Synchronous CDMA Communication Over Frequency-Selective Rayleigh Fading Channels" IEEE Transactions on Information Theory vol. 42. No. 1 Jan. 1996 p. 116-128.

* cited by examiner

*Primary Examiner*—Phuong Phu
(74) *Attorney, Agent, or Firm*—Merchant & Gould P.C.

(57) ABSTRACT

The present invention discloses a method for detecting orthogonal code CDMA signal implemented mainly through the following steps: estimating the total power of interference to the multi-path signals; performing matched filtering on the multi-path signals and performing maximum ratio combining on the multi-path signals by utilizing the total power of interference to the multi-path signals, to obtain the optimized matched filtering result; and performing joint detection on the optimized matched filtering result. There are two schemes for implementing: if the optimized matched filtering detection scheme is used, only the first two main steps are executed; if the joint detection scheme is used, all of the three steps are executed. In either of above two schemes, the interference code channels involved in the estimation of total power of interference to the multi-path signals are need to be selected, i.e., all of the code channels in the serving cell or the code channels in the serving cell which are not performed joint detection on are selected. As the present invention takes full advantage of the characteristic of orthogonal code as well as the channel estimation result, system performance can be improved at a lower price. The present invention is especially suitable for terminal devices in an orthogonal code Code Division Multiple Access system.

8 Claims, 1 Drawing Sheet

METHOD FOR DETECTING THE ORTHOGONAL CODE CDMA SIGNAL

FIELD OF THE INVENTION

The present invention relates to the field of mobile communication technology, particularly a received signal detection method applicable to an orthogonal code Code Division Multiple Access (CDMA) mobile communication system.

BACKGROUND OF THE INVENTION

In a CDMA mobile communication system, there are severe Multiple Access Interference (MAI) and Inter-Symbol Interference (ISI). The traditional received signal detection for single user employs a matched filtering method, wherein the matching filter performs correlated matching operation on the user's spread spectrum sequence waveform after channel response, to implement separation and detection of desired signal and interfering signal. In case of severe MAI and Multi-Path Interference (MPI), the performance of the traditional single-user matched filtering method can not meet the requirement. In a time-slot CDMA system, a joint detection technique can be used, i.e., information on the sent signals and the channel responses thereof for all users are utilized and the signal detection is treated as a unified joint detection process. When the received signal is detected with the joint detection method, Multiple Access Interference and Inter-Symbol Interference can be suppressed, and the performance of the Code Division Multiple Access system can be improved significantly (see A. Klein, G. K. Kaleh and P. W. Baier, "Zero forcing and minimum mean square error equalization for multiuser detection in code division multiple access channels," IEEE Trans. Veh. Technol., vol. 45, pp. 276-287, May 1996).

However, two challenges will arise when using joint detection to improve system performance:

1) when carrying out the joint detection, the receiver has to know the complete information on the channelization codes and the channel responses thereof for all user code channels. In certain cases, especially when a user terminal receives downlink signal, it is often impossible to use the joint detection method, as it is difficult to obtain the information completely;

2) the computation with the joint detection method is much more complicated than that with the single-user matched filtering method, which results in more difficult implementation and adverse effect to such indications as cost, power consumption, and reliability, etc.

It is a major technical requirement in application and development of Code Division Multiple Access mobile communication systems to provide respective signal detection solutions under different conditions (good or poor channel environment, whether or not complete information is available, etc.) and requirements (performance, complexity of implementation, etc.).

On the other hand, in 3GPP TDD standard, three different midamble allocation schemes exist: common, default, and specific modes. Wherein, common and default modes support joint detection technique, because they meet the first condition described above; however, specific mode is more suitable for certain situations with high-data-rate users. Because in specific mode, each user terminal only knows the user's own spread spectrum code and the corresponding channel response thereof, but does not know the corresponding relation between the midamble code and spread spectrum code of any other user, in such a case it is difficult to utilize information of other channels to perform joint detection, resulting in degraded performance of terminal detection.

In addition, in some applications, a simplified receiving detection algorithm is expected. For example, in an application where the terminals receive high-speed downlink data (e.g., High-Speed Downlink Packet Access, HSDPA), it is difficult to implement a more complicated receiving detection algorithm by the terminals; another example is: in some cases with relatively good channel environment, it is unnecessary to perform joint detection, and therefore a complicated algorithm is unnecessary.

In view of above demands, we must take full advantage of the features of Code Division Multiple Access mobile communication systems to develop a new signal detection method.

In a 3GPP TDD system, two kinds of important information can be utilized: one is the orthogonality of spread spectrum codes; the other is that the channel estimation results of all users can be obtained from the midamble code.

Regarding the orthogonality of spread spectrum codes: in an orthogonal code Code Division Multiple Access system, spread spectrum codes are the product of mutually orthogonal channelization codes and the scrambling codes for the cell; there is orthogonality between the different spread spectrum codes in the same cell. For example, in 3GPP TDD standard, complex spread spectrum codes $\underline{c}^{(k_{ru})}$ are binaries modulated with $j^i$ ($j^i$ represents rotation factor according to the serial number of code chip), and the spread spectrum codes $\underline{c}^{(k_{ru})}$ of downlink can be obtained with the following formula:

$$\underline{c}^{(k_{ru})} = w_{16}^{(k)} \cdot c_{16}^{(k)} \cdot \underline{v}$$

where, $c_{16}^{(k)}$ is the channalization code of $k_{ru}$ (Walsh Code with spread spectrum factor=16 and serial number=k), $w_{16}^{(k)}$ is the corresponding complex factor, $\underline{v}$ is the complex scrambling code vector dependent on the cell.

There is orthogonality between spread spectrum codes, i.e., they follow the following formula:

$$\underline{c}^{(k_1)^{*T}} \cdot \underline{c}^{(k_2)} = \begin{cases} 16 & k_1 = k_2 \\ 0 & k_1 \neq k_2 \end{cases}$$

where, *T represents conjugate transposition (identical to symbol H); when the spread spectrum factor is 16, the inner product of two spread spectrum codes with the same serial number is 16, and the inner product of two spread spectrum codes with different serial numbers is 0.

Regarding multi-user channel estimation: in a 3GPP TDD system, the channel response results $h^{(k)}$ of all users in the serving cell can be obtained with the midamble code, which is expressed as follows:

$$h^{(k)} = (h_1^{(k)}, h_2^{(k)}, \ldots, h_w^{(k)})^T$$

where, k=1, . . . , K, representing different channel estimation windows; W represents the length of channel estimation window, T represents transposition.

In three different midamble allocation schemes as specified in 3GPP TDD standard, although a definite corresponding relation between the midamble code and spread spectrum code may not be obtained, it is ensured that definite channel response estimation results corresponding to different users can be obtained. The channel response estimation result can reflect complete channel response of one or more code channels corresponding to the channel estimation window as well as the time waveform and power characteristic of multi-path response.

SUMMARY OF THE INVENTION

An object of the present invention is to provide a method for detecting orthogonal code CDMA signal, which takes full advantage of the characteristic of orthogonal code to detect orthogonal code CDMA signal, so as to implement matched filtering method or joint detection method in a simple and improved manner, and can improve performance of mobile communication systems at a lower price.

The object of the present invention can be achieved with the following technical solution: a method for detecting orthogonal code CDMA signal, applied to a receiving device in a time-slot orthogonal CDMA system using orthogonal code, comprising the step of:

A. performing channel estimation on received signal with the midamble code, so as to obtain the channel response estimation results of all users in the serving cell, wherein it further comprises the following steps:

B. selecting interference code channels involved in the estimation and estimating the total power of interference to multi-path signals by utilizing the channel response estimation results of all users in the serving cell;

C. performing matched filtering on the received signal with respect to each multi-path signal of each code channel by utilizing the spread spectrum code and the channel response estimation result thereof for the user to be detected, and performing maximum-ratio combining on the matched filtering results of the multi-path signals by utilizing the total power of interference to the multi-path signals, to obtain the optimized matched filtering result and obtain the orthogonal code CDMA signal detection result from the optimized matched filtering result.

Alternatively, the object of the present invention can also be achieved with the following technical solution: a method for detecting orthogonal code CDMA signal applied to a receiving device in a time-slot orthogonal CDMA system using orthogonal code, wherein it comprises the following steps:

A1. performing channel estimation on received signal with the midamble code, so as to obtain the channel response results of all users in the serving cell;

B1. estimating the total power of interference to the multi-path signals by utilizing the channel response results of all users in the serving cell with all code channels in the serving cell being selected as interference code channels involved in the estimation if it is selected not to perform joint detection, or with code channels in the serving cell not involved in the joint detection being selected as interference code channels in the estimation if it is selected to perform joint detection;

C1. performing matched filtering on the received signal with respect to each multi-path signal of each code channel by utilizing the spread spectrum code and the channel response estimation result thereof for the user to be detected, and performing maximum-ratio combining on the matched filtering results of the multi-path signals by utilizing the total power of interference to the multi-path signals, to obtain the optimized matched filtering result;

D1. if it is selected not to perform joint detection in step B1, terminating this step and outputting the optimized matched filtering result as the orthogonal code CDMA signal detection result; if it is selected to perform joint detection in step B1, proceeding with step E1;

E1. performing joint detection on the optimized matched filtering result obtained in step C1. and obtaining the joint detection result as the orthogonal code CDMA signal detection result.

The present invention provides a method for detecting orthogonal code CDMA signal implemented mainly through the following three steps: estimating the total power of interference to the multi-path signals; performing matched filtering on the multi-path signals and performing maximum ratio combining on the multi-path signals by utilizing the total power of interference to the multi-path signals, to obtain the optimized matched filtering output; and performing joint detection on the optimized matched filtering output.

There are two schemes for implementing: if the optimized matched filtering detection scheme is used, only the first two main steps are executed; if joint detection scheme is used, all of the three steps are executed.

The method according to the present invention utilizes the channel estimation results and the characteristic of orthogonal code to estimate the interference to each path of the signal and perform maximum ratio combining by utilizing the estimated interference. The method according to the present invention takes full advantage of the characteristic of orthogonal code as well as the result of multi-user channel estimation to implement matched filtering method or joint detection method in a simple and improved approach, and can improve performance of mobile communication systems at a lower price.

In the following two cases, the present invention is of great significance.

1) In certain cases where the receiver can not obtain the complete information on the channelization codes of the interference code channels currently accessed to as well as the corresponding channel response thereof, by use of the method according to the present invention to take full advantage of the information available to the receiver i.e., the characteristic of orthogonal code and the result of multi-user channel estimation, the existing matched filtering and joint detection algorithms are improved and the improvement of system performance is achieved.

In some cases where only the matched filtering method is applicable and the joint detection method can not be used due to limitation of complexity in implementation of the receiver, the optimized matched filtering method provided in the present invention can improve system performance significantly with complexity similar to that of the traditional matched filtering method. The present invention provides a solution to improve receiver performance at low complexity.

The method according to the present invention is applicable to a time-slot CDMA system using orthogonal code, in particular to application of terminal receivers. Of course, it is also applicable to base station receivers.

DETAILED DESCRIPTION OF THE EMBODIMENTS

Figure 1:
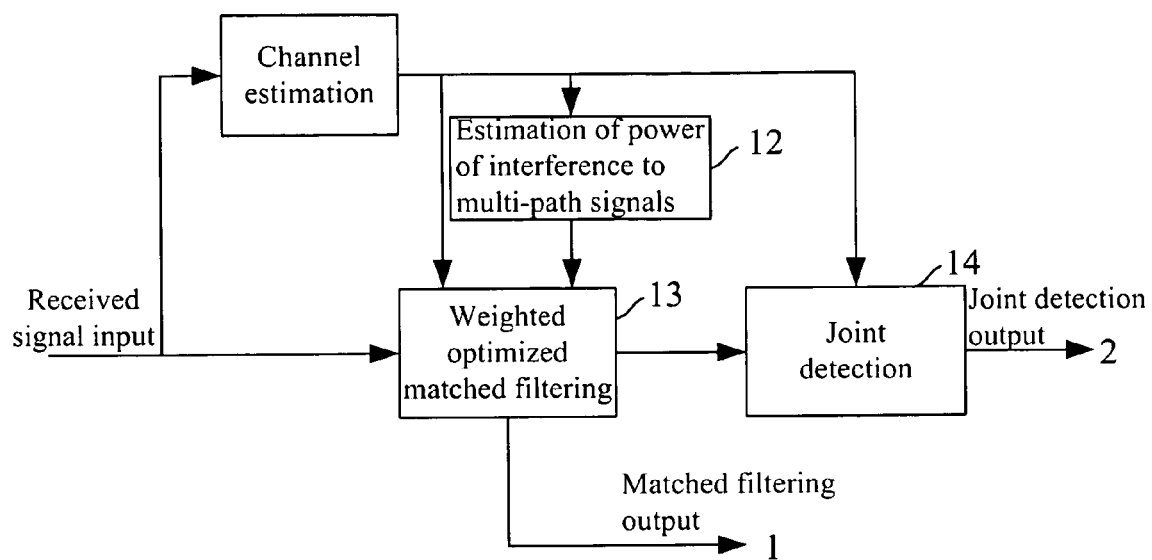
FIG. 1 is a flow diagram for implementing the method according to an embodiment of the present invention.

Hereunder the present invention is described in detail with reference to the attached drawings.

The method according to an embodiment of the present invention is a method for detecting orthogonal code CDMA signal proposed for utilizing the orthogonal characteristic of spread spectrum codes as well as channel responses of multiple users in view of a time-slot CDMA system using orthogonal code, which and can provide respective signal detection solutions under different conditions and requirements.

The steps for carrying out the method according to the embodiment of the present invention are described in detail with reference to FIG. 1.

Step 11: performing channel estimation on received signal by utilizing the midamble code, to obtain channel estimation results $h_i^{(k)}$ (channel estimation is a step that must be performed in any mobile communication system; the method according to the embodiment of the present invention is performed on the basis of the channel estimation results).

Step 12: estimating the total power $\sigma_{total,i}^2$ of interference to the multi-path signals by utilizing the channel estimation results.

The total power of interference code channels at each time delay position can be estimated with the channel estimation results. One of the characteristic of orthogonal code is: the power of mutual interference between different orthogonal code channels at the same time delay position is zero. On the basis of this characteristic, the total power of interference from interference code channels to a certain signal code channel at each time delay position should be the sum of the power of interference code channel at all time delay positions, subtracted by the power of interference code channel at the same time delay position as that time delay position (formula 2 below). The total power of interference to a signal code channel at each time delay position is the power of interference from interference code channels in the serving cell plus power of adjacent cells and thermal noise (formula 3 below).

First, the total power $P_{I,i}$ (symbol I characterizes interference only) from interference code channels at each time delay position is estimated with the channel estimation results $h_i^{(k)}$:

$$p_{I,i} = \sum_{InteferenceCodeChannel\ (k)} \|h_i^{(k)}\|^2 \qquad \text{Formula (1)}$$

where, i=1, ..., W, W represents channel estimation window length, k=1, ..., K, representing different channel estimation windows. It should be noted that, if it is selected to perform joint detection, the "interference code channel k" in the formula can be taken as the total of code channels in the serving cell that are not involved in the joint detection; if it is selected not to perform joint detection, the "interference code channel k" is taken as the total of all code channels in the serving cell, including the present code channel of the present user. When the former is taken, the joint detection method will be used in the subsequent steps, and the joint detection is performed on the weighted optimized matched filtering result with the channel estimation results of the spread spectrum codes and the joint detection result is obtained; when the latter is taken, only the weighted optimized matched filtering is performed with the channel estimation results of multiple users, the input signal, and the estimated power of interference to the multi-path signals, and the matched filtering result is obtained.

Next, the total power $I_i$ of interference from the interference code channel to the signal code channel at each time delay position (or referred to as tap position, there are altogether W time delay positions) is estimated by utilizing the characteristic of orthogonal code (the interference of orthogonal codes at the same time delay position is zero):

$$I_i = \sum_{j=1}^{W} p_{I,j} - p_{I,i} \qquad \text{Formula (2)}$$

The total power a $\sigma_{total,i}^2$ of interference to the multi-path signals, i.e., the total power of interference from interference code channels to the signal code channel at each time delay position plus the sum of interference from adjacent cells and thermal noise interference, expressed in the following formula, is obtained through further estimation:

$$\sigma_{total,i}^2 = \beta I_i + \sigma_{n0}^2 \qquad \text{Formula (3)}$$

where, $\sigma_{n0}^2$ is the power of interference from adjacent cells and thermal noise; $\beta$ is weighting factor for estimation of interference from interference code channels to the signal code channel at each time delay position in formula (2), which ranges from 0.5 to 2, taken as 1 in this embodiment.

Step 13: performing matched filtering on the multi-path signals and performing maximum ratio combining with considering the power of interference to the multi-path signals, to obtain the optimized matched filtering output. That is to say, perform correlated matched filtering on each of the multi-path signals by utilizing the channel response estimation results of the spread spectrum code of the user to be detected at each time delay position, and perform weighted summation according to the maximum ratio combining on the matched filtering result of the multi-path signals by utilizing the total power of interference to the signal code channel at each time delay position obtained in step 12, so as to obtain the optimized matched filtering output.

Supposing the weighting factor for each code channel after matched filtering at each time delay position is $w_j^{(k)}$, which is inversely proportional to the total power $\sigma_{total,i}^2$ of interference and expressed as follows:

$$w_i^{(k)} \propto \frac{1}{\sigma_{total,i}^2} \qquad \text{Formula (4)}$$

the optimized matched filtering output thus obtained is:

$$\begin{aligned}\hat{d}_{MF} &= w_1 A_1^{*T} e + w_2 A_2^{*T} e + \cdots + w_W A_W^{*T} e \qquad \text{Formula (5)}\\ &= \sum_{i=1}^{W} w_i A_i^{*T} e \\ &= B^{*T} e\end{aligned}$$

where, $w_i = \text{diag}(w_i^{(1)}, w_i^{(2)}, w_i^{(K)}) \otimes I$, being a matrix of weighting factors, where $\otimes$ is Kroneck product, I is a unit matrix; A is the system response matrix, $$B = \sum_{i=1}^{W} w_i A_i,$$

e is the received signal inputted.

In step 12, if the interference code channels involved in the estimation are all code channels in the serving cell (i.e., it is selected not to perform joint detection), this step is terminated and the optimized matched filtering result is outputted as the orthogonal code CDMA signal detection result, i.e., the matched filtering result $\hat{d}_{MF}$ outputted at end 1 in the figure is the orthogonal code CDMA signal detection result; if the interference code channels involved in the estimation are the code channels in the serving cell which are not performed joint detection on (i.e., it is selected to perform joint detection), proceed with step 14;

Step 14: performing joint detection on the optimized matched filtering output. That is to say, perform joint detection on the matched filtering result obtained in step 13 by utilizing the spread spectrum code and the corresponding channel response thereof (channel estimation result). The joint detection may use a linear processing scheme or a non-linear processing scheme. After the joint detection, the joint detection output result of the multi-code-channel signal obtained at end 2 in the figure is the orthogonal code CDMA signal detection result.

The joint detection may be implemented with decision feedback and interference cancellation method (one of the traditional joint detection methods) or Linear Block Equalization method. Wherein, the joint detection algorithm using the Linear Block Equalization is:

$$\hat{d}=(T)^{-1}B^{*T}e \quad \text{Formula (6)}$$

where, (T) can be obtained with the following formula:

$$T = \begin{cases} B^{*T}A & ZF-BLE \\ B^{*T}A+\sigma_n^2 & MMSE-BLE \end{cases}$$

where, ZF-BLE is Zero Forcing-Block Linear Equalization approach, MMSE-BLE is Minimum Mean Squared Error-Block Linear Equalization approach, $\sigma_n^2$ represents the power of all interferences, including those from the interference code channels in the serving cell.

In conclusion, in practical application, the method in the present invention can be implemented in either of the following two typical schemes.

One is to use joint detection scheme. This scheme requires implementing all of above steps (step 12, 13, and 14); however, in the estimation of power of interference to the multi-path signals in step 12, the interference code channel k is taken as the total of the other orthogonal code channels that are not involved in the joint detection.

The other is not to use the joint detection scheme. This scheme requires implementing the above optimized matched filtering steps (step 12 and 13); however, in the estimation of power of interference to the multi-path signals in step 12, the interference code channel k is taken as the total of all orthogonal code channels (including the present code channel of the present user).

The method according to the present invention is especially suitable for terminal devices of an orthogonal code Code Division Multiple Access system, and, of course, also applicable to base station devices.

The invention claimed is:

1. A method for detecting orthogonal code CDMA signal, applied to a receiving device in a time-slot CDMA system using orthogonal code, comprising the step of:
   A. performing, by the receiving device, channel estimation on received signal with a midamble code, so as to obtain the channel response estimation results of all users in the serving cell;
   B. selecting, by the receiving device, interference code channels involved in the estimation and estimating the total power of interference to multi-path signals by utilizing the channel response estimation results of all users in the serving cell;
   C. performing, by the receiving device, matched filtering on the received signal with respect to each multi-path signal of each code channel by utilizing a spread spectrum code and the channel response estimation result thereof for the user to be detected, and performing maximum-ratio combining on the matched filtering results of the multi-path signals by utilizing the total power of interference to the multi-path signals, to obtain the optimized matched filtering result and obtain the orthogonal code CDMA signal detection result from the optimized matched filtering result,
   wherein in said step B, the process that the total power of interference to the multi-path signals is estimated for the interference code channels involved in the estimation by utilizing the channel response estimation results of all users in the serving cell further comprises:

B1. estimating the total power of interference $P_{I,i}$ from the interference code channels at each time delay position with formula $$p_{I,i} = \sum_{InterferenceCodeChannel\ (k)} \|h_i^{(k)}\|^2$$

by utilizing the channel response results $h_i^{(k)}$, where, k=1, ..., K, representing different channel estimation windows;

B2. on the basis of the characteristic of orthogonal code, estimating the total power of interference $I_i$ from the interference code channels to the signal code channel at each time delay position with formula $$I_i = \sum_{j=1}^{W} p_{I,j} - p_{I,i},$$

where, i=1, ..., W, W represents channel estimation window length;

B3. estimating the total power of interference $\sigma_{total,i}^2$ to the multi-path signals with formula $\sigma_{total,i}^2 = \beta I_i + \sigma_{n0}^2$, where, $\sigma_{n0}^2$ is the power of interference from adjacent cells and thermal noise, $\beta$ is the weighting factor for estimation of interference from the interference code channels to the signal code channel at each time delay position.

2. The method as in claim 1, wherein: in said step B, selecting the interference code channels involved in the estimation is to select all the code channels in the serving cell as the interference code channels involved in the estimation, if it is selected not to perform joint detection; and in said step C, the optimized matched filtering result obtained is taken as the orthogonal code CDMA signal detection result.

3. The method as in claim 1, wherein: in said step B, selecting the interference code channels involved in the estimation is to select the code channels in the serving cell that are not involved in the joint detection as the interference code channels involved in the estimation, if it is selected to perform joint detection; and in said step C, to obtain the orthogonal code CDMA signal detection result from the optimized matched filtering result, the method further comprising:
   D. performing, by the receiving device, joint detection on the optimized matched filtering result obtained in step C, so as to obtain the joint detection result as the orthogonal code CDMA signal detection result.

4. The method as in claim 3, wherein: the joint detection in said step D further comprises: by using the joint detection method of linear block equalization, performing joint detection with formula $\hat{d}=(T)^{-1}B^{*T}e$ to obtain the joint detection result $\hat{d}$, where, $B^{*T}e$ is the optimized matched filtering result obtained in step C, e is the received signal inputted, (T) is obtained with formula $$T = \begin{cases} B^{*T}A & ZF-BLE \\ B^{*T}A+\sigma_n^2 & MMSE-BLE \end{cases},$$

where $\sigma_n^2$ represents the power of interference.

5. The method as in claim 3, wherein: the joint detection in said step D further comprises: performing joint detection on the optimized matched filtering result obtained in step C with decision feedback and interference cancellation method.

6. The orthogonal code CDMA signal detection method as in claim 1, wherein: said β ranges from 0.5 to 2.

7. The orthogonal code CDMA signal detection method as in claim 6, wherein: said β is taken as 1.

8. The orthogonal code CDMA signal detection method as in claim 1, wherein: in said step C, the process that the maximum ratio combining is performed to obtain the optimized matched filtering result further comprises:

C1. obtaining the weighting factors $w_i^{(k)}$ for the code channels after matched filtering at each time delay position with formula $$w_i^{(k)} \propto \frac{1}{\sigma_{total,i}^2}$$

by utilizing the total power $\sigma_{total,i}^2$ of interference to the multi-path signals;

C2. obtaining the optimized matched filtering result $\hat{d}_{MF}$ with the following formula:

$$\hat{d}_{MF} = w_1 A_1^{*T} e + w_2 A_2^{*T} e + \ldots + w_W A_W^{*T} e$$
$$= \sum_{i=1}^{W} w_i A_i^{*T} e$$
$$= B^{*T} e$$

where, the matrix of weighting factors $w_i$=diag($w_i^{(1)}$, $w_i^{(2)}$, ..., $w_i^{(K)}$)$\otimes$ I, where $\otimes$ is Kroneck product, I is a unit matrix; A is the system response matrix, $$B = \sum_{i=1}^{W} w_i A_i$$

e is the received signal inputted.

* * * * *